United States Patent
Chen

(10) Patent No.: US 7,307,983 B1
(45) Date of Patent: Dec. 11, 2007

(54) PROCESSING DESTRUCTIVE BREAKS IN MODEM OVER PACKET NETWORKS

(75) Inventor: Zhihui Chen, Trabuco Canyon, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 949 days.

(21) Appl. No.: 10/459,894

(22) Filed: Jun. 11, 2003

Related U.S. Application Data

(60) Provisional application No. 60/407,171, filed on Aug. 30, 2002.

(51) Int. Cl.
*H04L 12/66* (2006.01)
*H04L 1/00* (2006.01)

(52) U.S. Cl. .................. 370/352; 370/229; 375/222
(58) Field of Classification Search ............... 370/229, 370/230, 278, 282, 352, 389, 394, 395.52, 370/401, 477; 375/222; 379/1.01
See application file for complete search history.

(56) References Cited

U.S. PATENT DOCUMENTS 7,031,309 B1* 4/2006 Sautter et al. ............. 370/392

* cited by examiner

*Primary Examiner*—Quoc Tran
(74) *Attorney, Agent, or Firm*—Farjami & Farjami LLP

(57) ABSTRACT

There is provided a method for handling a destructive break for use by a first gateway device, where the first gateway device is in communication with a second gateway device over a packet network, the first gateway device is connected to a first modem over a first communication line and the second gateway device is connected to a second modem over a second communication line. The destructive break is received by the first gateway device from the first modem or the second gateway device. The first gateway device controls a sequence of steps of transmitting the received destructive break and discarding data. Further, the first gateway device receives a break acknowledgement in response to transmitting the destructive break and controls a sequence of steps of transmitting the received break acknowledgement, resetting trans-compression engines at the first gateway device and resumption of data transfer.

24 Claims, 3 Drawing Sheets

PROCESSING DESTRUCTIVE BREAKS IN MODEM OVER PACKET NETWORKS

RELATED APPLICATIONS

The present application claims the benefit of U.S. provisional application Ser. No. 60/407,171, filed Aug. 30, 2002, which is hereby fully incorporated by reference in the present application.

BACKGROUND OF THE INVENTION

1. Field of the Invention

The present invention relates generally to communications over packet networks. More particularly, the present invention relates to processing destructive breaks in modem communications over a packet network; such as the Internet, utilizing the Internet Protocol ("IP").

2. Related Art

FIG. 1 illustrates a block diagram of a conventional communication model for Modem over Internet Protocol ("MoIP"}. As shown, communication model 100 includes first client communication device 110 in communication with first gateway communication device 120 over PSTN providing transmit and receive channels or lines 112 and 114. Communication model 100 further includes second client communication device 150 in communication with second gateway communication device 140 over PSTN providing transmit and receive channels or lines 144 and 142. Communication model 100 enables communications between first gateway communication device 120 and second gateway communication device 140 via a packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. It is widely used for real-time voice and video transmissions where erroneous packets are not retransmitted.

For purposes of MoIP, communication devices 110, 120, 140 and 150 are capable of performing modem functions. The term modem stands for modulator-demodulator (i.e. digital-to-analog/analog-to-digital converter). Modem is a device that is capable of adapting a terminal or computer to an analog telephone line by converting digital pulses to audio frequencies and vice versa. Modems may support a variety of data modulation standards, such as ITU (International Telecommunications Union) standards: V.22bis, V.34, V.90 or V.92, etc. Communication devices 110, 120, 140 and 150 may also be cable or DSL modems, which are all digital and technically not modems, but referred to as modems in the industry. Typically, modems have built-in error correction, such as MNP2-4 or LAPM (or V.42) and data compression, such as MNP5, V.42bis or V.44. Modems are also capable of supporting various voice and facsimile standards.

Conventionally, the communication process for MoIP begins when first client modem (("M1") or first client communication device 110) calls first gateway modem (("G1") or first gateway communication device 120). As a result, G1 calls second gateway modem (("G2") or second gateway communication device 140), and G2 in turn calls second client modem (("M2") or second client communication device 150). According to MoIP, modem connections are terminated locally such that M1 and G1 handshake and make a connection locally and, similarly, M2 and G2 handshake and make a connection locally.

After a physical connection is established locally between M1 and G1, M1 and G1 negotiate to select and establish an error correction protocol (or logical connection), based on protocols such as V.42 or MNP. M1 and G1 may also negotiate and establish a data compression protocol, such as MNP5, V.42bis or V.44. Similarly, M2 and G2 may negotiate and establish an error correction and a data compression protocol locally.

During modem communications, break signals may be transmitted from a data terminal equipment (DTE) (not shown) to M1. Such break signals may be interpreted by M1 to represent various commands based on M1's configuration. For example, a break signal may simply be interpreted by M1 as a request by the DTE for M1 to escape to command mode for accepting commands from the DTE. In another configuration, M1 may simply receive and transmit the break signal to G1 in sequence with data. Yet, in one setting, M1 may transmit the break signal to G1 immediately and ahead of all buffered data. In a particular setting, M1 may interpret the break signal as a command to flush or destroy all buffered data and further transmit the break signal to G1 immediately, which is generally referred to as a destructive break signal.

Proper handling of destructive break signals is extremely crucial during modem communications. For example, an incorrect destruction or transmission of a single byte of data can corrupt compression dictionaries, which would cause compressor and decompressor to become out of sync and therefore misinterpret the compression codes.

Processing of destructive break signals becomes even more important during MoIP operation as the gateway modems G1 and G2 are also affected and must process the destructive break signals. One proposal for processing the destructive break signals for MoIP suggests that an eight-bit break byte be continuously transmitted as part of the packets transmitted over the IP link between G1 and G2. The value of the break byte is then incremented when a destructive break is received by G1 from M1. Next, a break signal message is transmitted from G1 to G2 via an expedited channel, and the break byte is sent via the data channel. Upon receipt of the break signal message via the expedited channel, G2 flushes all buffered data and all incoming data until the break byte is received.

The above-described proposal, however, suffers from many problems. For example, such proposal requires that an additional break byte to be transmitted in the data channel continuously, even though no break signal has been received. Because break signals are rear occurrences during modem communications, such proposal sacrifices too much of the data bandwidth. Therefore, there is an intense need for other approaches that can provide efficient and easy-to-implement methods and systems for handling destructive breaks while preserving the data bandwidth.

SUMMARY OF THE INVENTION

In accordance with the purpose of the present invention as broadly described herein, there is provided system and method for communication over a network. In one aspect of the present invention, a method of handling a destructive break for use by a first gateway device is provided. The first gateway device is in communication with a second gateway device over a packet network, the first gateway device is connected to a first modem over a first communication line and the second gateway device is connected to a second modem over a second communication line. The method comprises the steps of receiving the destructive break from the first modem over the first communication line; requesting the first modem to cease transmitting data, in response to the receiving step; transmitting all data that has been packetized, by the first gateway device for transmission to the second gateway device, approximately when the step of receiving the destructive break occurs; receiving acknowledgment for the data from the second gateway; transmitting a break message to the second gateway device after the step of receiving acknowledgment; discarding all data that has not been transmitted to the first modem approximately when the step of receiving the destructive break occurs; and discarding all data received from the second gateway device until receiving a break acknowledgement message from the second gateway device in response to the break message.

In other aspects of the above-described method, the step of requesting includes transmitting a receiver not ready (RNR) frame to the first modem, the step of receiving the break acknowledgement message over a data channel of the packet network, and the step of transmitting the break message transmits the break message over a reliable expedited channel of the packet network.

In another aspect, the method further comprises the step of discarding all data that has not been packetized, by the first gateway device for transmission to the second gateway device, approximately when the step of receiving the destructive break occurs; resetting all trans-compression engines of the first gateway device in response to receiving the break acknowledgement message, and requesting the first modem to resume transmitting data to the first gateway device.

In a further aspect, the method also comprise the steps of initializing one or more of the trans-compression engines with new sequence numbers; transmitting the new sequence numbers to the second gateway device.

In a separate aspect of the present invention, there is provided a first gateway device for handling a destructive break. The first gateway device being in communication with a second gateway device over a packet network, wherein the first gateway device is connected to a first modem over a first communication line and the second gateway device is connected to a second modem over a second communication line. The first gateway device comprises a first receiver configured to receive the destructive break from the second gateway device over the packet network; a first transmitter configured to transmit all data that has been packetized, by the first gateway device for transmission to the first modem, approximately when the first receiver receives the destructive break; a second receiver configured to receive acknowledgment for the data from the first modem; a second transmitter configured to transmit a break message to the first modem after the second receiver receives the acknowledgment; wherein the first gateway device discards all data that has not been transmitted to the second gateway device approximately when the first receiver receives the destructive break, and wherein the first gateway device discards all data received from the first modem until receiving a break acknowledgement message from the first modem in response to the break message.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other communications networks and is not limited to modem over IP.

Figure 1:
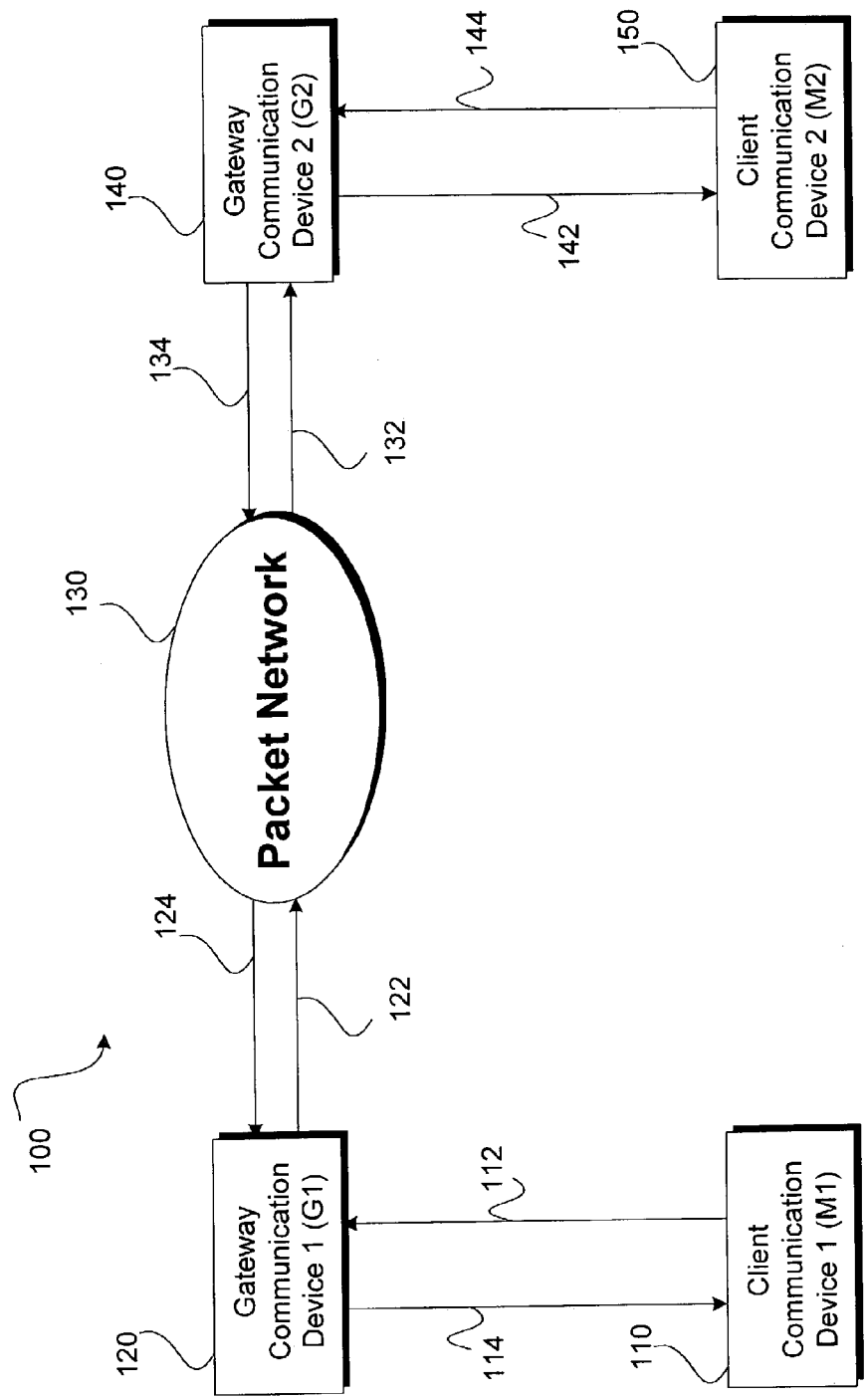
FIG. 1 illustrates a block diagram of a conventional communications network utilizing modems for communication over a packet network.
Figure 2:
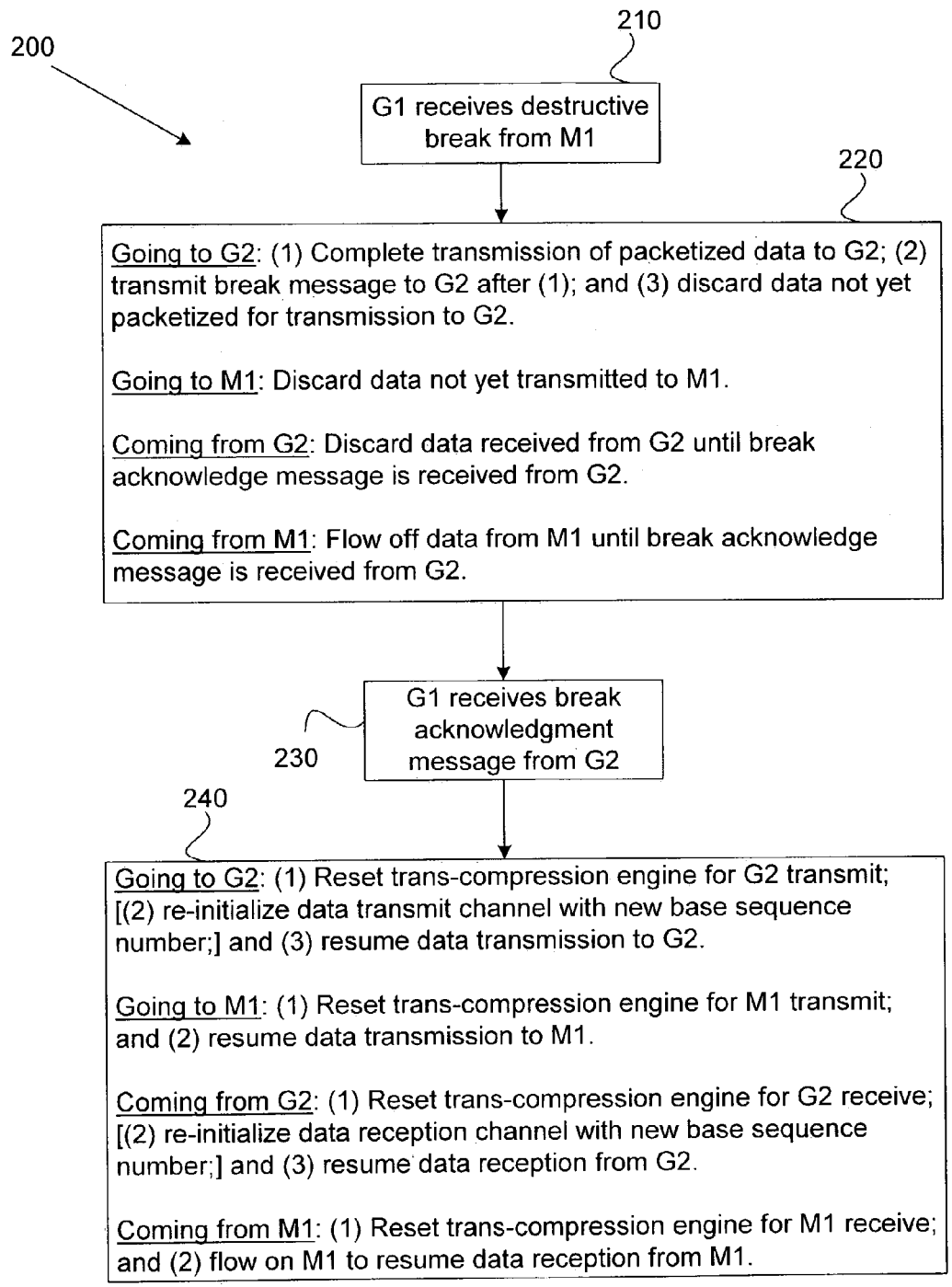
FIG. 2 illustrates a flow diagram of a destructive break processing algorithm for use by a gateway device, such as G1, to process destructive breaks received from its local client modem or M1, as shown in FIG. 1.

FIG. 2 illustrates a flow diagram of a destructive break processing algorithm 200 for use by a gateway device, such as G1, for processing breaks received from its local client modem or M1. As shown in FIG. 2, G1 receives a destructive break from M1 at step 210. Such destructive break may be transmitted as a signal over the telephone line from M1 to G1 if the data connection established between M1 and G1 is a non-error-corrected connection. On the other hand, if M1 and G1 have established an error-corrected connection, such as MNP or LAPM connection, destructive break is transmitted from M1 to G1 in the form of a data packet. For the purpose of the following description, it is assumed that M1-G1 and M2-G2 connections are reliable or error-corrected connections.

Turning to FIG. 2, upon receipt of the destructive break from M1 by G1 at step 210, destructive break processing algorithm 200 moves to step 220, where G1 takes various actions with respect to its reception and transmission lines with M1 and G2.

With respect to G1-G2 transmission line 122, G1 will complete data transmission in progress by transmitting all data that has been packetized by the trans-compression engine of G1 and discard other data in G1 buffer that has not been processed or packetized by the trans-compression engine of G1 for transmission to G2. After transmission of all packetized data and receipt of data acknowledgement from G2, G1 transmits a break message to G2 over packet network 130 to inform G2 of the break condition. In one embodiment, G1 transmits the break message to G2 using the reliable expedited channel of packet network 130. It should be noted that in one embodiment, G1 may only finish the transmission of the packetized frame that was being transmitted at the time G1 received the destructive break from M1 and discard all other packetized frames, if any, as well as other data in G1 buffer that has not been processed or packetized by the trans-compression engine on G1-G2 transmission line 122.

Regarding G1-M1 transmission line 114, G1 discards any data, whether or not packetized, that has not been transmitted by G1 to M1.

With respect to G1-G2 reception line 124, G1 discards all data that is received from G2 until a break acknowledgement message is received by G1 from G2 in response to the break message that has already been sent from G1 to G2.

With respect to G1-M1 reception line 112, after receipt of the break message from M1, G1 requests M1 to cease transmitting any more data by sending a flow off request on G1-M1 transmission line 114. In a non-error-corrected mode, such flow off condition can be requested by sending the ASCII character for XOFF. In a reliable or error-corrected mode, G1 transmits an RNR (receiver not ready) message to M1 to advise M1 that G1 cannot receive any more data.

Next, destructive break processing algorithm 200 moves to step 230 where G1 receives a break acknowledgement message from G2 over packet network 130 in response to the break message. In one embodiment, G1 receives the break acknowledgement message over the data channel of packet network 130. Upon receipt of the break acknowledgement message from G2 by G1 at step 230, destructive break processing algorithm 200 moves to step 240, where G1 takes various actions with respect to its reception and transmission lines with M1 and G2.

As shown in FIG. 2, at step 240, G1 resets its trans-compression engine, if any, used for communication on G1-G2 transmission line 122. In other words, trans-compression engine parameters are set to predetermined values, such as the values used to initialize the trans-compression engine at the beginning of each connection. Trans-compression engines for MoIP are discussed in U.S. application Ser. No. 10/229,439, filed Aug. 27, 2002, entitled "Trans-Compression Selection and Configuration in Modem Over Packet Networks", which is hereby incorporated by reference. In one of the embodiments described above where G1 does not transmit all packetized data, but merely completes the data packet that is being transmitted to G2 at the time G1 received the destructive break from M1 and discards all other packetized data, G1 also re-initializes the data transmission channel using a new sequence number for use by the trans-compression engine on G1-G2 transmission line 122 and the trans-compression engine on G2-G1 reception line 132. The reason for initializing the trans-compression engines with new sequence numbers is to ensure that trans-compressions engines at the two ends remain in sync, since out of sync sequence numbers Would cause retransmission of data packets that cannot be acknowledged and would cause termination of the connection.

In embodiments where all packetized data are transmitted by G1 to G2 prior to sending the break message by G1 to G2, there is no need for G1 to re-initialize the data transmission channel with the new sequence number and transmit the new sequence number to G2 for use by the trans-compression engine on G2-G1 reception line 132, since the two trans-compression engines remain in sync based on the old sequence number. Next, after resetting the trans-compression engine on G1-G2 transmission line 122, G1 resumes transmission of data to G2.

With respect to G1-M1 transmission line 114, G1 resets its trans-compression engine, if any, used for communication on G1-M1 transmission line 114 and resumes data transmission to M1.

Regarding G1-G2 reception line 124, G1 resets its trans-compression engine, if any, used for communication on G1-G2 reception line 124. As discussed above, in one of the embodiments, G1 also re-initializes the data reception channel using a new sequence number for use by the trans-compression engine on G1-G2 reception line 124 and the trans-compression engine on G2-G1 transmission line 134. However, in other embodiments, there may not be a need for G1 to re-initialize the data reception channel using the new sequence number and transmit the new sequence number to G2 for use by the trans-compression engine on G2-G1 transmission line 134, since the two trans-compression engines remain in sync based on the old sequence number. Next, after resetting the trans-compression engine on G1-G2 reception line 124, G1 resumes reception of data from G2

With respect to G1-M1 reception line 112, G1 resets its trans-compression engine, if any, used for communication on G1-M1 reception line 112 and resumes data reception from M1.

Figure 3:
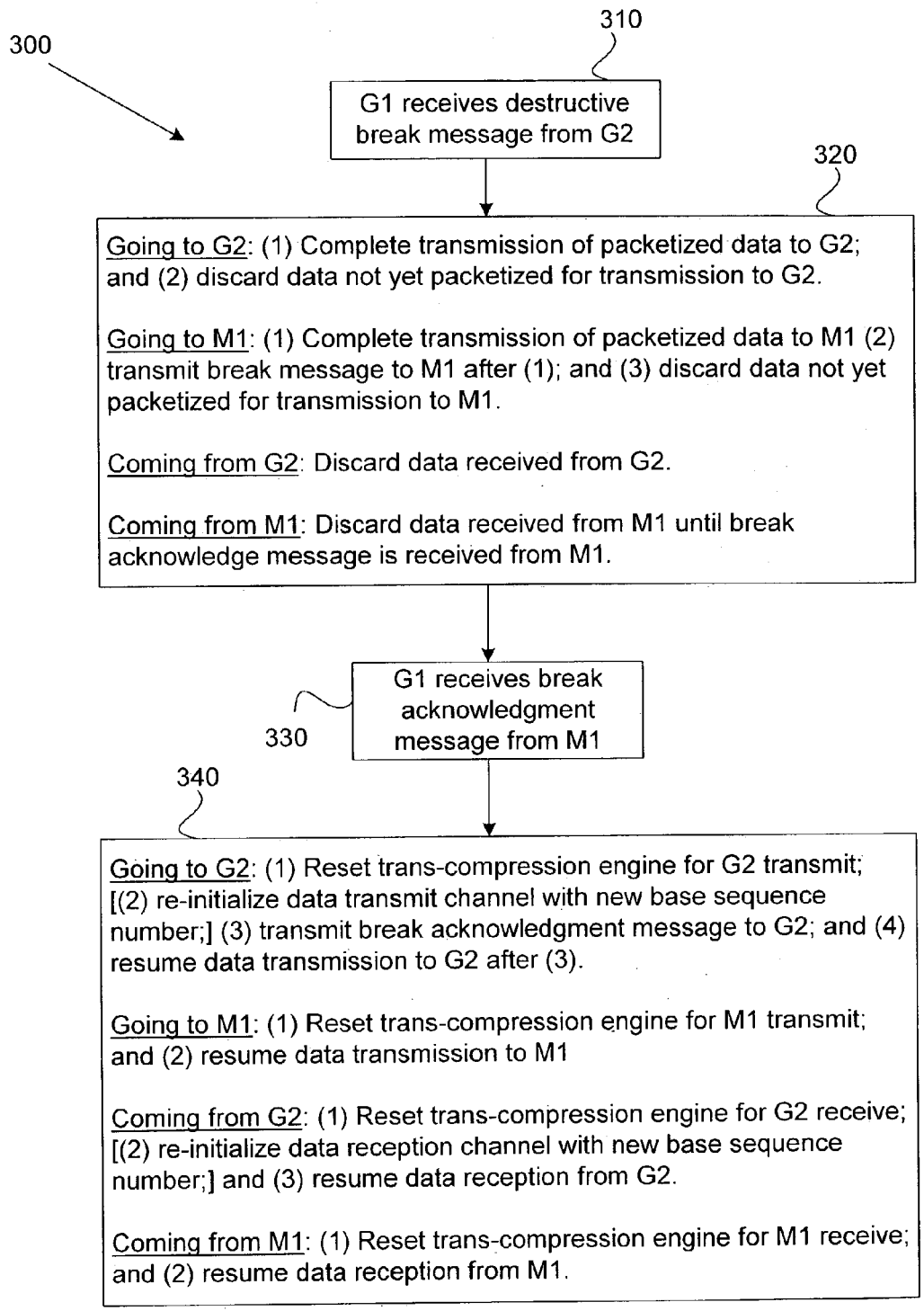
FIG. 3 illustrates a flow diagram of a destructive break processing algorithm for use by a gateway device, such as G1, to process destructive breaks received over the packet network from G2, as shown in FIG. 1.

FIG. 3 illustrates a flow diagram of a destructive break processing algorithm 300 for use by a gateway device, such as G1, for processing breaks received over packet network 130 from G2. As shown in FIG. 3, G1 receives a destructive break message from G2 at step 310 over packet network 130. Upon receipt of the destructive break message from G2, destructive break processing algorithm 300 moves to step 320, where G1 takes various actions with respect to its reception and transmission lines with M1 and G2.

With respect to G1-G2 transmission line 122, G1 will complete data transmission in progress by transmitting all data that has been packetized by the trans-compression engine of G1, await receipt of data acknowledgement from G2 and discard other data in G1 buffer that has not been processed or packetized by the trans-compression engine of G1 for transmission to G2. In one embodiment, G1 may only finish the transmission of the packetized frame that was being transmitted when G1 receives the destructive break from M1, await receipt of data acknowledgement from G1 and discard all other packetized frames, if any, as well as other data in G1 buffer that has not been processed or packetized by the trans-compression engine on G1-G2 transmission line 122.

With respect to G1-M1 transmission line 114, G1 will complete data-transmission in progress by transmitting all data that has been packetized by the trans-compression engine of G1, await receipt of data acknowledgement from M1 and discard other data in G1 buffer that has not been processed or packetized by the trans-compression engine of G1 for transmission to M1. After transmission of all packetized data, G1 transmits a break message to M1 over G1-M1 transmission line 114 to inform M1 of the break condition in the event of a reliable connection between M1 and G1 or, otherwise, G1 transmits a break signal to M1. In one embodiment, G1 may only finish the transmission of the packetized frame that was being transmitted when G1 receives the destructive break from G2, await receipt of data acknowledgement from M1 and discard all other packetized frames, if any, as well as other data in G1 buffer that has not been processed or packetized by the trans-compression engine on G1-M1 transmission line 114.

With respect to G1-G2 reception line 124, G1 discards all data that is received from G2. It should be noted that no data should be received from G2 at this point, since G2 should not be transmitting any data until a break acknowledgement message is transmitted from G1 to G2.

With respect to G1-M1 reception line 112, G1 discards all data that is received from M1, until G1 receives a break acknowledgement from M1 in response to the break message sent to M1.

Next, destructive break processing algorithm 300 moves to step 330 where G1 receives a break acknowledgement message from M1 over G1-M1 reception line 112 in response to the break message sent to M1. Upon receipt of the break acknowledgement message from M1 by G1 at step 330, destructive break processing algorithm 300 moves to step 340, where G1 takes various actions with respect to its reception and transmission lines with M1 and G2.

As shown in FIG. 3, at step 340, G1 resets its trans-compression engine, if any, used for communication on G1-G2 transmission line 122. In one of the embodiments described above where G1 does not transmit all packetized data, but merely completes the data packet that is being transmitted to G2 at the time G1 received the destructive break from M1 and discards all other packetized data, G1 also re-initializes the data transmission channel using a new sequence number for use by the trans-compression engine on G1-G2 transmission line 122 and the trans-compression engine on G2-G1 reception line 132. However, in embodiments where all packetized data are transmitted by G1 to G2 and acknowledged prior to sending the break message by G1 to G2, there is no need for G1 to re-initialize the data transmission channel using the new sequence number and transmit the new sequence number to G2 for use by the trans-compression engine on G2-G1 reception line 132, since the two trans-compression engines remain in sync based on the old sequence number. Next, after resetting the trans-compression engine on G1-G2 transmission line 122, G1 transmits a break acknowledgement message to G2 over packet network 130 and resumes transmission of data to G2.

With respect to G1-M1 transmission line 114, G1 resets its trans-compression engine, if any, used for communication on G1-M1 transmission line 114 and resumes data transmission to M1.

Regarding G1-G2 reception line 124, G1 resets its trans-compression engine, if any, used for communication on G1-G2 reception line 124. As discussed above, in one of the embodiments, G1 also re-initializes the data reception channel using a new sequence number for use by the trans-compression engine on G1-G2 reception line 124 and the trans-compression engine on G2-G1 transmission line 134. However, in other embodiments, there may not be a need for G1 to re-initialize the data reception channel using the new sequence number and transmit the new sequence number to G2 for use by the trans-compression engine on G2-G1 transmission line 134, since the two trans-compression engines remain in sync based on the old sequence number.

Next, after resetting the trans-compression engine on G1-G2 reception line 124, G1 resumes reception of data from G2

With respect to G1-M1 reception line 112, G1 resets its trans-compression engine, if any, used for communication on G1-M1 reception line 112 and resumes data reception from M1.

In one embodiment of the present invention, the following information may be transmitted as part of a break message: (1) break type; (2) break length (optional); (3) break sequence number (in the event of multiple breaks); (4) last base sequence number of data packet on data transmit channel, which applies to the embodiment where packetized data are discarded prior to transmission or receipt of acknowledgment from G2, and it is used by G2 to determine when to stop taking any data from G1 over IP network 130 and when to resume accepting data from G1 over IP network 130; and (5) last base sequence number of data packet on data receiving channel, which applies to the embodiment where packetized data are discarded prior to transmission or receipt of acknowledgment by G1, and it is used by G1 to determine when to stop taking any data from G2 over IP network 130 and when to resume accepting data from G2 over IP network 130

In one embodiment of the present invention, the following information may be transmitted as part of a break acknowledgment message: (1) break sequence number; (2) first sequence number of data packet on data transmit channel, which applies to the embodiment where packetized data are discarded prior to transmission or receipt of acknowledgment from G2, and it is an indication of first resumed data to G2; and (3) first sequence number of data packet on data receiving channel, which applies to the embodiment where packetized data are discarded prior to transmission or receipt of acknowledgment by G1, and it is an indication of first resumed data from G2.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method of handling a destructive break for use by a first gateway device, said first gateway device being in communication with a second gateway device over a packet network, wherein said first gateway device is connected to a first modem over a first communication line and said second gateway device is connected to a second modem over a second communication line, said method comprising the steps of:

receiving said destructive break from said first modem over said first communication line;

requesting said first modem to cease transmitting data, in response to said receiving step;

transmitting all data that has been packetized, by said first gateway device for transmission to said second gateway device, approximately when said step of receiving said destructive break occurs;

receiving acknowledgment for said data from said second gateway;

transmitting a break message to said second gateway device after said step of receiving acknowledgment;

discarding all data that has not been transmitted to said first modem approximately when said step of receiving said destructive break occurs; and discarding all data received from said second gateway device until receiving a break acknowledgement message from said second gateway device in response to said break message.

2. The method of claim 1, wherein said step of requesting includes transmitting a receiver not ready (RNR) frame to said first modem.

3. The method of claim 1 further comprises the step of receiving said break acknowledgement message over a data channel of said packet network.

4. The method of claim 1 further comprises the step of discarding all data that has not been packetized, by said first gateway device for transmission to said second gateway device, approximately when said step of receiving said destructive break occurs.

5. The method of claim 1, wherein said step of transmitting said break message transmits said break message over a reliable expedited channel of said packet network.

6. The method of claim 5 further comprising the steps of:
resetting all trans-compression engines of said first gateway device; and
requesting said first modem to resume transmitting data to said first gateway device.

7. The method of claim 6 further comprising the steps of:
initializing one or more of said trans-compression engines with new sequence numbers;
transmitting said new sequence numbers to said second gateway device.

8. A method of handling a destructive break for use by a first gateway device, said first gateway device being in communication with a second gateway device over a packet network, wherein said first gateway device is connected to a first modem over a first communication line and said second gateway device is connected to a second modem over a second communication line, said method comprising the steps of:
receiving said destructive break from said second gateway device over said packet network;
transmitting all data that has been packetized, by said first gateway device for transmission to said first modem, approximately when said step of receiving said destructive break occurs;
receiving acknowledgment for said data from said first modem;
transmitting a break message to said first modem after said step of receiving acknowledgment;
discarding all data that has not been transmitted to said second gateway device approximately when said step of receiving said destructive break occurs; and
discarding all data received from said first modem until receiving a break acknowledgement message from said first modem in response to said break message.

9. The method of claim 8 further comprises the step of discarding all data that has not been packetized, by said first gateway device for transmission to said first modem, approximately when said step of receiving said destructive break occurs.

10. The method of claim 8, wherein said step of receiving said destructive break receives said destructive break over a reliable expedited channel of said packet network.

11. The method of claim 10 further comprising the steps of:
resetting all trans-compression engines of said first gateway device;

transmitting a break acknowledgement message to said second gateway device; and
resuming data exchange with said first modem and said second gateway device.

12. The method of claim 11 further comprising the steps of:
initializing one or more of said trans-compression engines with new sequence numbers;
transmitting said new sequence numbers to said second gateway device.

13. A first gateway device for handling a destructive break, said first gateway device being in communication with a second gateway device over a packet network, wherein said first gateway device is connected to a first modem over a first communication line and said second gateway device is connected to a second modem over a second communication line, said first gateway device comprising:
a first receiver configured to receive said destructive break from said first modem over said first communication line;
a first transmitter configured to transmit a request to said first modem to cease transmitting data, in response to said destructive break;
a second transmitter configured to transmit all data that has been packetized, by said first gateway device for transmission to said second gateway device, approximately when said first receiver receives said destructive break;
a second receiver configured to receive acknowledgment for said data from said second gateway;
wherein said second transmitter transmits a break message to said second gateway device after said second receiver receives said acknowledgment, wherein said first gateway device discards all data that has not been transmitted to said first modem approximately when said first receiver receives said destructive break, and wherein said first gateway device discards all data received from said second gateway device until receiving a break acknowledgement message from said second gateway device in response to said break message.

14. The first gateway device of claim 13, wherein said request is a receiver not ready (RNR) frame.

15. The first gateway device of claim 13, wherein said second receiver receives said break acknowledgement message over a data channel of said packet network.

16. The first gateway device of claim 13, wherein said first gateway device discards all data that has not been packetized, by said first gateway device for transmission to said second gateway device, approximately when said first receiver receives said destructive break.

17. The first gateway device of claim 13, wherein said second transmitter transmits said break message over a reliable expedited channel of said packet network.

18. The first gateway device of claim 17, wherein said first gateway device resets all trans-compression engines of said first gateway device, and wherein said first transmitter transmits a request to said first modem to resume transmitting data to said first gateway device.

19. The first gateway device of claim 18, wherein said first gateway device initializes one or more of said trans-compression engines with new sequence numbers, and wherein said second transmitter transmits said new sequence numbers to said second gateway device.

20. A first gateway device for handling a destructive break, said first gateway device being in communication with a second gateway device over a packet network, wherein said first gateway device is connected to a first modem over a first communication line and said second gateway device is connected to a second modem over a second communication line, said first gateway device comprising:

a first receiver configured to receive said destructive break from said second gateway device over said packet network;

a first transmitter configured to transmit all data that has been packetized, by said first gateway device for transmission to said first modem, approximately when said first receiver receives said destructive break;

a second receiver configured to receive acknowledgment for said data from said first modem;

a second transmitter configured to transmit a break message to said first modem after said second receiver receives said acknowledgment;

wherein said first gateway device discards all data that has not been transmitted to said second gateway device approximately when said first receiver receives said destructive break, and wherein said first gateway device discards all data received from said first modem until receiving a break acknowledgement message from said first modem in response to said break message.

21. The first gateway device of claim 20, wherein said first gateway device discards all data that has not been packetized, by said first gateway device for transmission to said first modem, approximately when said first receiver receives said destructive break.

22. The first gateway device of claim 20, wherein said first receiver receives said destructive break over a reliable expedited channel of said packet network.

23. The first gateway device of claim 22, wherein said first gateway device resets all trans-compression engines of said first gateway device, wherein said first transmitter transmits a break acknowledgement message to said second gateway device, and wherein said first gateway device resumes data exchange with said first modem and said second gateway device.

24. The first gateway device of claim 23, wherein said first gateway device initializes one or more of said trans-compression engines with new sequence numbers, and wherein said first transmitter transmits said new sequence numbers to said second gateway device.

* * * * *